United States Patent Office

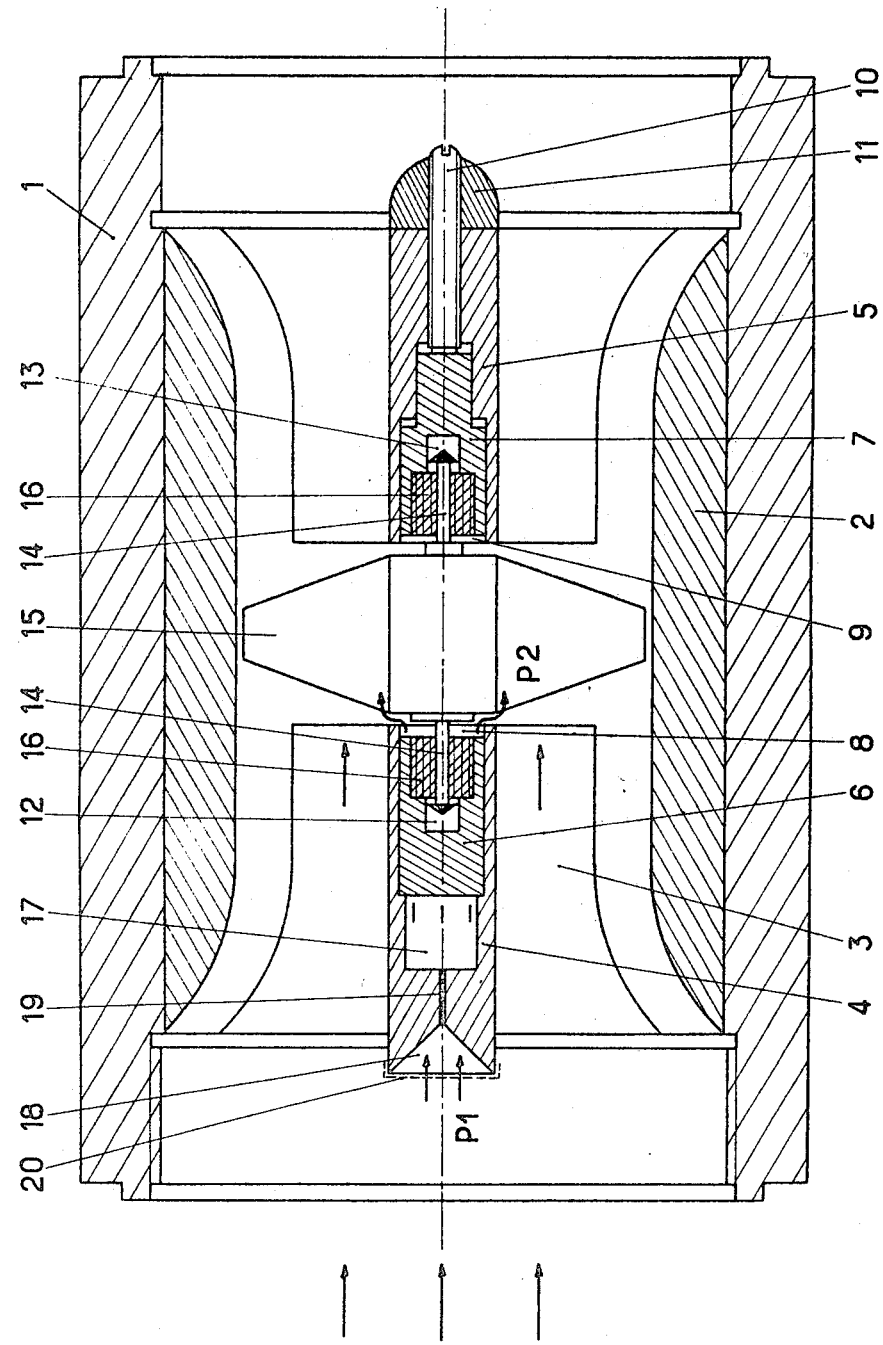

3,398,930
Patented Aug. 27, 1968

3,398,930
ROTOR AND ITS VARIOUS APPLICATIONS IN PARTICULAR TO FLUID METERS
Jean Faure-Herman, 126 Quai Louis Bleriot,
Paris, France
Filed Feb. 10, 1966, Ser. No. 526,446
Claims priority, application France, Feb. 12, 1965,
5,414
7 Claims. (Cl. 253—39)

ABSTRACT OF THE DISCLOSURE

A fluid flow meter has a passageway for the flow of fluid and a rotor having opposite pivots and rotatably supported in the passageway by two cup bearings engaged by the pivots of the rotor. The downstream bearing is stationary although preferably adjustable, while the upstream bearing is provided by a piston movable axially in a cylinder to which fluid pressure is supplied through a restricted passageway as a function of the rate of flow of fluid through the passageway.

---

The taking up of longitudinal play in the pivoting of rotors is an important problem, especially in the case of spindles with sharp-pointed ends revolving in tapered cups or else on ball bearings. This kind of pivoting is certainly that which gives rise to the least friction, and consequently, the greatest sensitiveness. Thanks to this quality, it is the method of pivoting which is the best suited to meters for fluid, such as propeller flow meters, for instance. However, longitudinal wear, which is the more speedy as the angular velocity of the propeller is great, is harmful for the duration of pivoting life. Actually, the spindle of the rotor is centered on the abutment cups. Progressively, as longitudinal play is increased by the wear of the sharp points, the centering of the rotor becomes more and more defective. The downstream point is well seated in the bottom of the hollow abutment, but the upstream point is maintained less and less transversally, and the rotor takes on a gyroscopic movement whose destructive effect then accentuates very quickly.

The only way of obviating this is to take up longitudinal play, this taking up being preferably done automatically. Moreover, this taking up of play is also most desirable when pivoting is effected by a spindle revolving in cylindrical bearings with end stops of any shape.

Spring devices for taking up longitudinal play have existed for some considerable time. One of the two abutments is constantly pressed on the end of the rotor spindle in the direction of the taking up of play. But this device has a serious disadvantage: if the pressure of the spring is too great, friction becomes too great to the detriment of sensitiveness, especially at slow speeds, and if the tension of the spring is restricted to prevent a prohibitive braking, an axial oscillation occurs which is also very harmful for the pivots and metering accuracy.

With regard to these known devices, the present invention has the object of producing a rotor in which there is an automatic taking up of the play of the propeller and in which friction forces are reduced to a minimum.

Another object of the invention is to submit the pressure between the propeller and the bearings, to a pressure determined by the flowing fluid, this pressure being the greater as the flowing speed is high, so that the pressure of the bearings on the propeller, and consequently, the friction, are proportional to the flow, and are thus very slight at low speeds when sensitiveness is required.

Another object of the invention, is to produce a rotor with automatic taking up of play, in which the pressure of the bearings on the propeller is a function of the displacement speed of the fluid, the object of the invention being also to avoid the risk of longitudinal oscillation at high flowing speeds of the fluid.

Another object of the invention is to produce a meter for fluid provided with a rotor according to the invention.

The invention will be more fully understood from the following detailed description of a preferred embodiment shown by way of example in the accompanying drawing which is a somewhat schematic axial section of a fluid flow meter in accordance with the invention.

The rotor 15, formed in the particular case by a propeller and a flow meter, is introduced into a calibrated nozzle 2 situated in the tubular body 1. Each end of this nozzle carries struts 3 whose central cores 4 and 5 act as supports for the upstream 6 and downstream bearings 7. The two cylinder-shaped bearings are able to move longitudinally in bores 8 and 9 made for this purpose in the central cores 4 and 5 of the struts 3. The upstream bearing 6 normally abuts on the bottom of the bore 8. The positioning of the downstream bearing 7 is adjustable longitudinally thanks to a threaded shank 10 screwing into the core 7 and with a lock-nut 11. Each of the bearings 6 and 7 has longitudinal stops 12 and 13 which, in the example chosen, are tapered cups allowing at the same time the centering of the sharp-pointed ends of the spindle 14 of the spiral rotor 15. Bushings 16 can precede the stops 12 and 13, and in this case, the stops and the ends of the spindle 14 can be of any kind of shape, because centering is ensured by the bushings 16.

To take up longitudinal play due to the wear of the ends of the spindle 14 and the stops 12 and 13, the upstream bore 8 is extended by a small compression chamber 17 communicating with the hollow end 18 of the upstream core 4 by a calibrated duct 19.

In the case of a loaded fluid, a wire gauze filter cover 20 can protect the compression chamber 17 and the duct 19 from impurities.

According to a known law of the mechanics of filters, an over-pressure $P_1$ is set up by the flowing speed at the upstream end of the core 4 immersed in the fluid and a depression $P_2$ at its downstream end. The over-pressure $P_1$ is transmitted to the fluid contained in the chamber 17 by the communicating duct 19. The bearing 6 is thus subjected to a difference of pressure between its upstream and downstream faces, which is the more marked as the flowing speed is high.

The displacement of the bearing from upstream to downstream, is free as far as the stop on the spindle 14 of the rotor 15 which itself abuts on the cup 13 by its downstream end. The stops 12 and 13 are thus constantly in contact with the ends of the spindle 14 whatever the respective degree of wear of the ends of the spindle and stops, and this with a pressure that is slighter when the flowing speed is small. In other words, at low flowing speeds, when the rotor must have its maximum sensitiveness, it will thus not be affected by the pressure on the ends of its spindle.

On the other hand, the calibrated duct 19 of slight diameter will prevent any rapid return of the fluid contained in the chamber 17 and the bearing 6 will not risk setting up a longitudinal oscillation at high flowing speeds, as is the case when taking up of play is done with a metal spring system.

The only way to obviate this is to take up longitudinal play, this taking up being preferably done automatically. Moreover, this taking up of play is also very desirable when pivoting is effected by a spindle revolving in cylindrical bushings with end abutments of any kind of shape.

The invention applies to this rotor whatever its applications may be. Nevertheless, the invention relates in particular to a meter for fluid such as a flow meter in which the fluid current drives the propeller 15.

The rotation speed ensured by any kind of means gives the value of the flow. The totalization of the revolutions of the rotor gives the quantity of fluid that has flowed.

Of course, the invention is not restricted to the examples of embodiment described and shown above, from which other methods and forms of embodiment can be provided without going outside of the scope of the invention for that purpose.

What I claim is:

1. A fluid flow meter comprising means defining a passageway for the flow of fluid to be measured, a rotor having a helical vane and axially aligned pivots, and means rotatably supporting said rotor in said passageway with its rotational axis disposed in the direction of flow of said fluid, said supporting means comprising first bearing means comprising a first cup bearing rotatably engaged by a first one of said pivots and second bearing means comprising a second cup bearing rotatably engaged by the second of said pivots, means supporting said second cup bearing for movement in a direction axial of said rotor and means actuated by said fluid to move said second cup bearing axially toward said first bearing means and thereby eliminate play while avoiding excessive bearing pressure.

2. A fluid flow meter according to claim 1, in which said supporting means comprises a cylinder, and said second cup bearing comprises a piston slidable in said cylinder.

3. A fluid flow meter according to claim 2, in which said means for moving said second cup bearing comprises means for directing fluid into said cylinder to act on said piston.

4. A fluid flow meter according to claim 3, in which said means for directing fluid to said cylinder comprises a recess opening upstream of fluid flow and a calibrated restricted passage connecting said recess with said cylinder.

5. A fluid flow meter according to claim 1, in which said means actuated by said fluid to move said second cup bearing is responsive to the velocity of fluid flow through said passageway to apply greater pressure to said second cup bearing with increase of fluid velocity.

6. A fluid flow meter according to claim 1, in which means is provided for adjusting axially of said rotor the position of said first bearing means.

7. A fluid flow meter according to claim 1, in which said rotor has a shaft on the ends of which said pivots are provided and in which said bearing means further comprises radial bearings rotatably supporting said shaft.

References Cited

UNITED STATES PATENTS

| 2,683,224 | 7/1954 | Cole | 73—231 X |
| 2,748,714 | 6/1956 | Henry | 103—112 |

FOREIGN PATENTS

| 1,325,314 | 3/1963 | France. | |

EVERETTE A. POWELL, JR., *Primary Examiner.*